(12) United States Patent
Cieplinski

(10) Patent No.: US 7,676,085 B2
(45) Date of Patent: Mar. 9, 2010

(54) METHOD AND APPARATUS FOR REPRESENTING A GROUP OF IMAGES

(75) Inventor: Leszek Cieplinski, Guildford (GB)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/929,207

(22) Filed: Oct. 30, 2007

(65) Prior Publication Data

US 2008/0069455 A1 Mar. 20, 2008

Related U.S. Application Data

(62) Division of application No. 10/875,237, filed on Jun. 25, 2004.

(30) Foreign Application Priority Data

Jul. 4, 2003 (EP) .................................. 03254263

(51) Int. Cl.
G06K 9/00 (2006.01)
G06K 9/60 (2006.01)
G06K 9/54 (2006.01)

(52) U.S. Cl. ................ 382/167; 382/224; 382/284

(58) Field of Classification Search .................. 382/162, 382/164, 165, 167, 168, 172, 173, 190, 218, 382/219, 254, 272, 305; 358/515, 518; 707/6; 345/549, 589, 591, 600–604, 619

See application file for complete search history.

(56) References Cited

U.S. PATENT DOCUMENTS

| | | | |
|---|---|---|---|
| 5,119,186 A | * | 6/1992 | Deacon et al. .............. 358/524 |
| 5,164,711 A | * | 11/1992 | Tuel, Jr. ...................... 345/602 |
| 5,802,214 A | | 9/1998 | Eschbach et al. |
| 6,246,790 B1 | * | 6/2001 | Huang et al. ................ 382/162 |
| 6,285,995 B1 | | 9/2001 | Abdel-Mottaleb et al. |
| 6,345,274 B1 | * | 2/2002 | Zhu et al. ...................... 707/5 |
| 6,430,312 B1 | | 8/2002 | Huang et al. |
| 6,661,918 B1 | | 12/2003 | Gordon et al. |
| 6,788,813 B2 | | 9/2004 | Cooper |
| 6,801,657 B1 | * | 10/2004 | Cieplinski ................... 382/164 |
| 6,944,332 B1 | * | 9/2005 | Brechner ..................... 382/165 |
| 6,944,334 B2 | * | 9/2005 | Piatt et al. ................... 382/167 |
| 7,003,518 B2 | | 2/2006 | Lee et al. |

(Continued)

FOREIGN PATENT DOCUMENTS

CN 1340178 A 3/2002

(Continued)

OTHER PUBLICATIONS

ISO/IEC FDIS 15938-3, "Multimedia Content Description Interface Part 3: 'Visual'," p. 56 (2001).

(Continued)

*Primary Examiner*—Amir Alavi
(74) *Attorney, Agent, or Firm*—Birch, Stewart, Kolasch & Birch, LLP.

(57) ABSTRACT

A method of representing a group of images comprises determining the values of one or more dominant colors for the group of images and deriving a dominant color representation expressing the group of images in terms of one or more of said dominant color values.

7 Claims, 3 Drawing Sheets

U.S. PATENT DOCUMENTS

Figure 1:
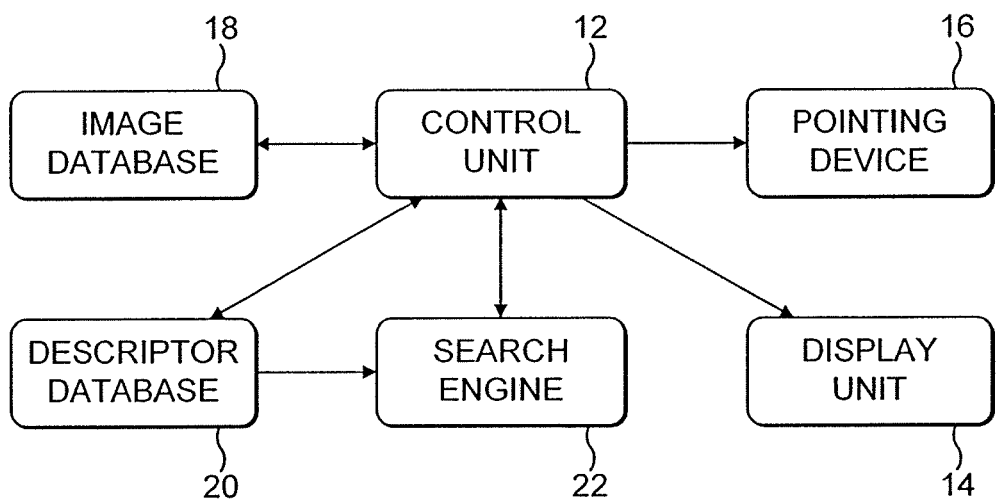

| | | | |
|---|---|---|---|
| 7,015,931 B1 * | 3/2006 | Cieplinski | 345/619 |
| 7,151,851 B2 | 12/2006 | Ladjevardi | |
| 7,194,127 B2 * | 3/2007 | Brechner | 382/165 |
| 7,376,263 B2 * | 5/2008 | Kim et al. | 382/162 |
| 7,415,153 B2 * | 8/2008 | Mojsilovic | 382/162 |
| 2002/0106122 A1 | 8/2002 | Messing et al. | |
| 2003/0086627 A1 * | 5/2003 | Berriss et al. | 382/305 |
| 2005/0013491 A1 * | 1/2005 | Cieplinski | 382/226 |
| 2008/0063267 A1 * | 3/2008 | Cieplinski | 382/165 |
| 2008/0063286 A1 * | 3/2008 | Cieplinski | 382/190 |
| 2008/0118146 A1 * | 5/2008 | Cieplinski | 382/165 |

FOREIGN PATENT DOCUMENTS

| | | |
|---|---|---|
| CN | 1358296 A | 7/2002 |
| EP | 1302865 A1 | 4/2003 |
| WO | WO-00/67203 A1 | 11/2000 |

OTHER PUBLICATIONS

Introduction to MPEG-7, Sections 13.4 and 13.5, pp. 198-203, Wiley 2002.

"Group-of-Frame/Picture Color Histogram Descriptors For Multimedia Applications," Ferman et al., International Conference on Image Processing ICIP'00, Vancouver, Sep. 2000.

"Automatic Video Scene Extraction by Shot Grouping," Lin et al., International Conference on Pattern Recognition ICPR'00, Barcelona, Sep. 2000.

"Integrating Color and Spatial Features for Content-Based Video Retrieval," Lin et al., 2001 IEEE, pp. 592-595.

"Approximating the Statistical Distribution of Color Histogram for Content-Based Image Retrieval," Kuo et al., 2000 IEEE, pp. 2007-2010.

"A survey on the use of pattern recognition methods for abstraction, indexing and retrieval of images and video," Antani et al., 2002 Pattern Recognition Society, pp. 945-965.

"MPEG-7: A Content Description Standard Beyond Compression," Abdel-Mottaleb et al., 1999 IEEE, pp. 770-777.

* cited by examiner

METHOD AND APPARATUS FOR REPRESENTING A GROUP OF IMAGES

This application is a Divisional of co-pending application Ser. No. 10/875,237, filed on Jun. 25, 2004, the entire contents of which are hereby incorporated by reference and for which priority is claimed under 35 U.S.C. §120.

The invention relates to a method and apparatus for representing a group of images, especially in terms of colour, and for searching for and retrieving images.

There are various known techniques for representing an image using visual features such as colour appearing in the image. For example, in one known technique, each pixel is assigned a colour value, and a colour histogram is derived by setting bins for a number of ranges of colour values, and counting the number of pixels in an image which have a colour value in each of the ranges. The colour histogram is then used as a representation of the image. In another known technique, one or more dominant colours in an image are identified, and the dominant colours are used to represent the image.

The present invention is especially concerned with group of images. The groups of images may, for example, be a sequence of images (frames or fields) from a video, or any group of images from any source where the images are associated in some way. The group of images could, for example, relate to a single scene or shot in a video. A term known in the art for such a group of images is GroupOframes/GroupOfPictures. In the following, this term will be referred to as GoFGoP. In this specification, the term image will be used to describe a frame/picture in a group, irrespective of whether it is a video frame or field or a still picture. Also, the terms image and image region are interchangeable, except where apparent from the context.

One approach for representing a group of images is to select a single image from the group of images, and treating the single image as representative of the entire group. The single image is then represented using a known technique for representing a single image. The single image may, for example, be the first or last image appearing in a sequence, or the group of images may be analysed to identify an image in the group that is in some way especially representative of the group, in terms of the visual feature of interest.

Another approach is to aggregate the group of images. The existing MPEG-7 Visual Standard (ISO/IEC 15938-3) allows for the description of colour in a video segment or a group of pictures using a GoFGoP colour descriptor. This is described in detail, for example, in the book: Introduction to MPEG-7 Multimedia content description interface Edited by Manjunath, Salembier and Sikora, ISBN 0-471-48678-7, section 13.5. Three techniques for aggregating a group of images are described: average, median and intersection.

In each technique, a colour histogram is derived for each image in the group, as described above. In the averaging technique, the colour histograms are accumulated, and then each accumulated bin value is divided by N, where N is the number of images in the group, to produce an average histogram. In the median technique, for each bin value, the histogram values for the group are arranged in ascending/descending order, and the median value is assigned to the respective bin. The intersection histogram is obtained by, for each bin, taking the minimum histogram value from the histograms for the group. In other words, the intersection histogram represents the number of pixels of a particular colour or range of colours (corresponding to a bin) that appears in all of the images.

In each case, the aggregated histogram (average, median or intersection) is then represented using a Scalable Color Descriptor (section 13.4 of the book mentioned above) which involves applying a Haar transform-based encoding scheme to the values of the color histogram.

The paper "Automatic video scene extraction by shot grouping" by Tong Lin and Hong-Jiang Zhang relates to the grouping of shots into scenes. A group of frames forming a shot is analysed to determine the dominant colour objects in each frame, and then to determine the dominant colour objects persisting throughout the group of frames. This produces a dominant colour histogram for a shot. Dominant colour histograms for different shots are compared. If the correlation between two shots is high, the shots are grouped into a scene.

Aspects of the invention are set out in the accompanying claims.

Figure 6:
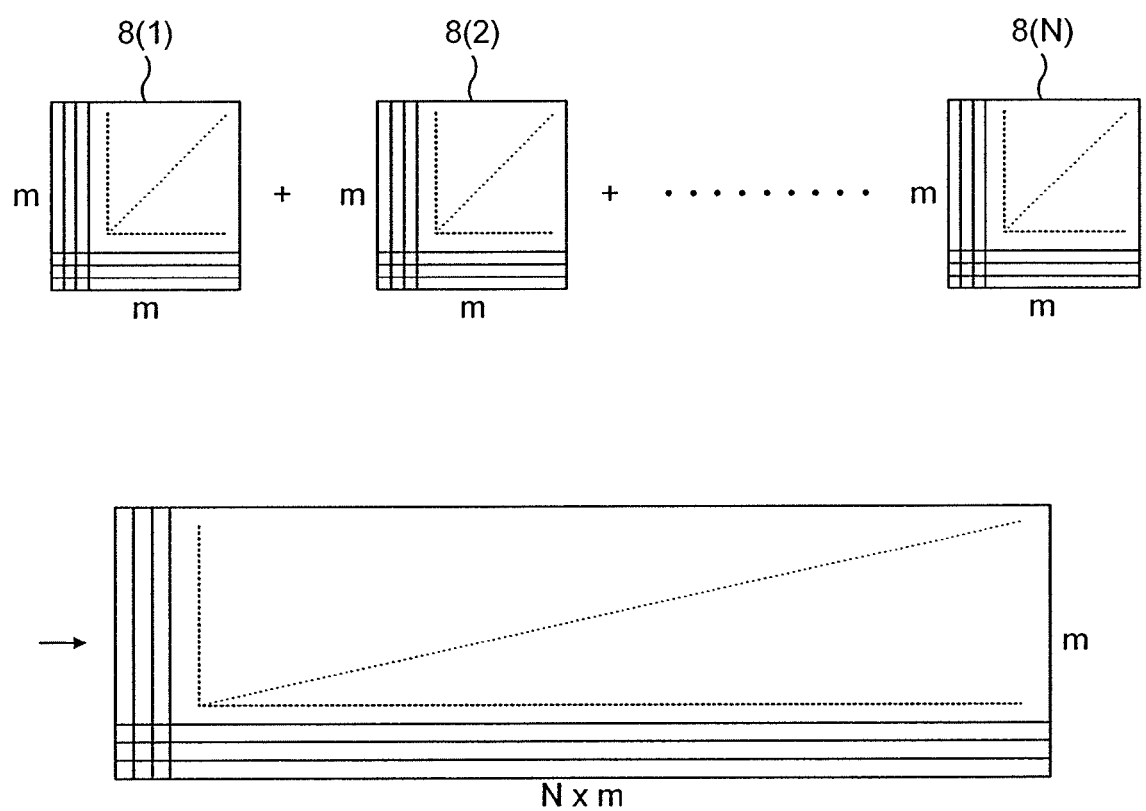

An embodiment of the invention will be described with reference to the accompanying drawings of which:

FIG. 1 is a block diagram of a system according to an embodiment of the invention;

FIGS. 2*a*, 2*b* and FIGS. 3 to 5 are graphs illustrating a method of merging of image descriptors according to an embodiment of the invention;

FIG. 6 illustrates the combining of images to form a super-image.

A system according to an embodiment of the invention is shown in FIG. 1. The system includes a control unit 12 such as a computer for controlling operation of the system, the control unit 12 including at least a memory and a processor, a display unit 14 such as a monitor, connected to the control unit 12, for displaying outputs including images and text and a pointing device 16 such as a mouse for inputting instructions to the control unit 12. The system also includes an image database 18 storing digital versions of a plurality of groups of images and a descriptor database 20 storing descriptor information, described in more detail below, for each of the groups of images stored in the image database 8. In this example, each group of images corresponds to a shot from a video sequence. There are various known techniques for dividing a video sequence into shots, which will not be described in detail here. The invention can be applied to any group of images, or image regions, including regions within images. The images may be stored in groups, or, for example, there may be an identifier indicating which images belong to the same group.

Each of the image database 18 and the descriptor database 20 is connected to the control unit 12. The system also includes a search engine 22 which is a computer program under the control of the control unit 12 and which operates on the descriptor database 20.

In this embodiment, the elements of the system are provided on a single site, such as an image library, where the components of the system are permanently linked.

The descriptor database 20 stores descriptors of all the images stored in the image database and additionally of all the groups of images in the image database. The image and group descriptors are derived as described below.

Each image has an associated image descriptor, which expresses the respective image in terms of the dominant colour or colours in the image. In this embodiment, the image descriptors are derived essentially as described in our copending application WO 00/67203, the contents of which are incorporated herein by reference.

A brief summary of deriving an image descriptor follows. Each image has a plurality of pixels, and each pixel has an associated colour value, in the relevant colour space, such as RGB.

The colour values and the corresponding pixels are clustered in the colour domain in order to determine dominant colours and which colours correspond to a respective dominant colour. This is done using a suitable clustering algorithm, such as the Generalized Lloyd Algorithm, as described in section 13.3.1 of the MPEG-7 book mentioned above.

The cluster centroids resulting from the clustering procedure are used as dominant colour values, and the sets of pixels that form the perspective clusters are stored for computation of additional fields (weight and colour variance) as discussed below.

Alternatively, the dominant colours may be derived using a histogram approach, as described in W000/67203.

In that case, a colour histogram for an image is derived, by selecting a predetermined number of colour values, or ranges of colour values, in the relevant colour space, and the number of pixels in the image having each colour value, or a value in the relevant range, is counted.

Generally, the histogram will have one or more peaks, and the peaks (or a subset thereof, such as a predetermined number of the highest peaks) are selected as the dominant colours and colour values/pixels are clustered in the colour domain with respect to the dominant colours.

Once the colour values have been clustered, a colour variance value is determined for each dominant colour, expressing for each dominant colour the variance of the colour values for the respective cluster centred on the dominant colour. The dominant colour can be considered as a mean value for the colour distribution in the relevant cluster.

The calculation of the variance can be expressed using the following equation:

$$CV_j = \frac{1}{N} \sum_{k=0}^{N-1} (m_j - p_{kj})^2$$

where j indexes the color component, $m_j$ is j-th component of the dominant color, $p_{kj}$ is j-th component of the k-th pixel value, and the summation is over N pixels corresponding to the dominant color under consideration.

The descriptor also includes a weight value for each dominant colour, which is a measure of the relative significance of each dominant colour in the image. In this example, the weight is the ratio of the number of pixels in the cluster corresponding to the dominant colour value to the total number of pixels in the image. The weight may be expressed as a percentage.

The dominant colour values, and their respective variances and weights are combined to form a colour descriptor of the image. The descriptor may also have other components, such as a degree n, indicating the number of dominant colours. The descriptor may also include covariance values Cij, where i and j represent colour components in the relevant colour space, for each dominant colour and cluster, as well as variance values.

The colour descriptor for each image is stored in the descriptor database.

It is important to note that a dominant colour descriptor is not the same as a histogram representation of an image. A dominant colour descriptor includes the values of the dominant colours in an image, which may have been determined in earlier processing steps. A histogram representation of an image includes the dominant colours, but there is no identification of the dominant colours. The dominant colour descriptor may also include other values, such as values corresponding to variance of colour distribution with respect to the or each dominant colour, but a histogram representation does not involve calculating or determining the variance or other such values. Other components of a dominant colour descriptor may include, for example, a weight indicating the influence of the dominant colour in the image, the number of dominant colours in the image, and spatial homogeneity of pixels corresponding to the dominant colors in the image.

A group descriptor for a group of images is derived as follows, according to a first embodiment.

The image descriptors for each image in the group of images is retrieved from the descriptor database. The image descriptors are then combined to form a group descriptor.

The group descriptor has a similar format to an image descriptor (dominant colours, variances, weights etc). Preferably, the number of dominant colours in the group descriptor is between 1 and 8. However, the number of dominant colours may be unlimited or may be set with a predetermined maximum. The number of dominant colours in the image descriptor also may be unlimited or may be limited by a predetermined maximum. The maximum for the image descriptors and the maximum for the group descriptors may not necessarily be the same so that, for example, the image descriptors may have more dominant colours than the group descriptor.

In this example, there are two images in a group, and the two respective image descriptors are combined as follows.

In general terms, the image descriptors are combined by merging clusters in the images based on proximity of the clusters in colour space.

Figure 2A:
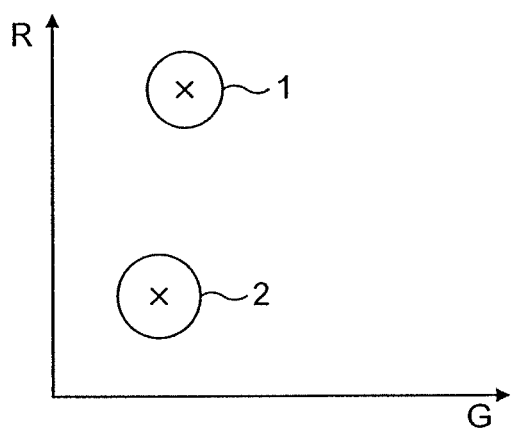
Figure 2B:
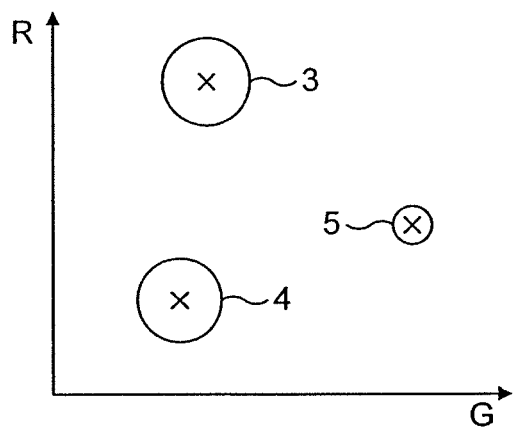

FIGS. 2a and 2b are abstract representations of clusters in colour space of the two images. FIG. 2a represents the first image and FIG. 2b represents the second image. In each case, the circles represent a cluster for a respective dominant colour. For simplicity, the colour space is shown in two dimensions, although the colour space will usually be in three dimensions. Also, the clusters do not necessarily correspond to circles in colour space, but are shown as such for simplicity, and the circles do not give any indication of the weight of the clusters. In the following, a representation such as in shown in FIGS. 2a and 2b (that is, a representation in terms of dominant colours and respective clusters) will be described as a cluster descriptor.

Figure 3:
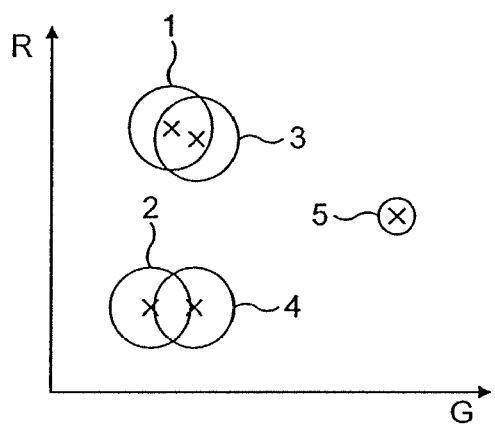

The two cluster descriptors of FIGS. 2a and 2b are combined to form a cluster super-descriptor. This is illustrated in FIG. 3.

Next, the distance between each pair of clusters (as defined above) in the super-descriptor is determined, using a suitable distance measurement in colour space. In this example, the distance is the Euclidean distance in colour space.

In this example, there are two dominant colours and two clusters in the first image, and three dominant colours and three clusters in the second image, numbered 1 to 5 respectively. Each dominant colour corresponds to a point in RGB colour space, represented by a cross in FIGS. 2 to 5. The distance between a pair of clusters is the distance in 3-D RGB space between the centroids of the clusters. The distance between each pair of dominant colours in the first and second images is calculated including, in this example, clusters from the same image. The pair of dominant colours giving the smallest distance measurement are selected.

Next, the clusters corresponding to the two dominant colours are merged.

In this example, as shown in FIG. 3, the two closest clusters are clusters 1 and 3, and these are merged as follows.

The dominant or representative colour value of the merged cluster is a weighted average of the dominant colours of the two clusters, where the weight is as defined above. Thus, for two dominant colours $m_1$, $m_2$, and respective weights W1 and W2, the merged dominant colour m has value:

$$m = w_1 m_1 + w_2 m_2$$

where $w_1$, $w_2$ are the relative weights, W1/W1+W2 and W2/W1+W2 respectively.

The variance of the merged cluster is also calculated, using the variances of the two clusters merged together. In this example, each colour component is treated independently, and it is assumed that the variance of the merged cluster is a weighted sum of two Gaussian distributions. This results in the following formula for the variance of the merged cluster:

$$\sigma^2 = w_1 \sigma_1^2 + w_2 \sigma_2^2 + w_1 w_2 (m_1 - m_2)^2,$$

where $\sigma_1^2$, $\sigma_2^2$ are the variances of the component clusters, $m_1$, $m_2$ are their means and $w_1$, $w_2$ are the relative weights, as defined above.

The weight W of the merged cluster is W1+W2.

The merged cluster is treated as a new cluster, with weight, mean and variance as explained above.

Figure 4:
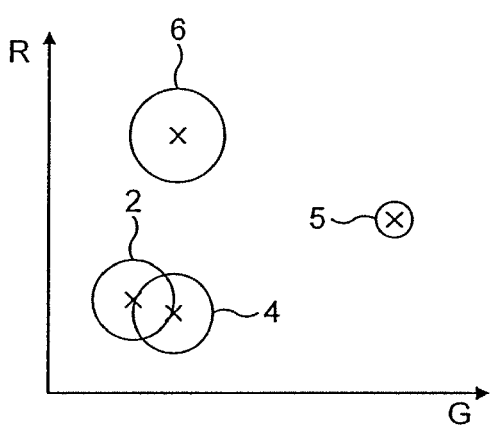

This is illustrated in FIG. 4, where clusters 1 and 3 are merged to form a new cluster 6.

Next, there is another iteration of the merging steps. The two clusters 1 and 3 that were merged in the first iteration are excluded from further consideration, and replaced by the merged cluster 6, as shown in FIG. 4.

The merging steps are then repeated, by identifying the closest pair of clusters, including the merged cluster 6, in colour space and merging them, as outlined above.

Figure 5:
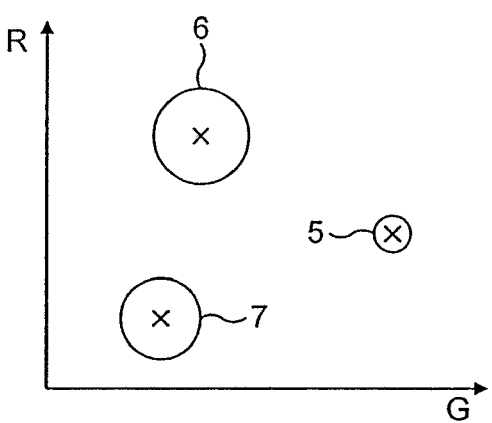

In this example, in the second iteration, clusters 2 and 4 are the closest pair of clusters. These are merged to produce a new cluster 7, with dominant colour, weight and variance derived as set out above from the dominant colours, weights and variances of clusters 2 and 4. The merged cluster 7 replaces clusters 2 and 4, as shown in FIG. 5.

The merging iterations are repeated until a predetermined condition is met. For example, the predetermined condition may be that merging is continued until a predetermined number of total clusters (sum of merged clusters, and original remaining clusters in the first and second images) remains. Alternatively, the predetermined condition may be that the merging is continued until the distance between each remaining pair of clusters is greater than a given value. Alternatively, the method may involve a predetermined number of iterations. More than one of the predetermined conditions may be combined.

In the present case, the merging is repeated until a predetermined number (three) of clusters are remaining.

In the above example, merged clusters are considered in further iterations. However, they may be excluded from further iterations. Also, in the above example, clusters may be merged with other clusters within the same image, but in an alternative, clusters may be merged only with clusters appearing in another image, in the first and/or any subsequent iteration. This reduces the number of distance measurements.

Although described in terms of clusters, it is understood that the merging operates on the values in the descriptors ie dominant colour, variance and weight, and it is not necessary to analyse the clusters themselves.

Once the iterations have been completed, the remaining clusters are used to form a group descriptor. More specifically, for each final cluster, there is a representative or dominant colour, a respective variance, and a respective weight. These are combined, together with a degree m indicating the number of final clusters, to form a group descriptor. The group descriptor may also include other factors, such as an indication of the colour space, or colour quantization used in the representation. The group descriptor is a GoFGoP dominant colour descriptor.

In the above example, there are only two images in the group of images. However, the method is also applicable to groups containing more than two images. The cluster descriptors for each image in the group could all be combined, to form a super descriptor, as above. Alternatively, the group of images could be combined in sub-groups, for example, in groups of two or three, in sequence or not in sequence, and then the descriptors for the sub-groups combined in a similar way.

Where there are a large number of images in a group, the above method potentially involves a large number of clusters, and a large number of calculations of distances between clusters.

In view of the above, a variation of the above method takes account of the fact that most images in a video shot or a collection will be very similar and the corresponding descriptors will be similar. This means that most clusters can be merged on a per-frame basis without significant loss of precision.

In more detail, the variation considers the images of a group of images in a sequence. As in the example described above, the image descriptors have already been derived and are stored in the descriptor database. The cluster descriptors for a first and second image in a group of images are retrieved. Next, the distances between each cluster in the pair of images are determined. If the distance between any pair of clusters is below a predetermined threshold, the pair of clusters are merged. The merged clusters and any remaining clusters in the pair of images are collected in a super-descriptor, as in the example above. The cluster descriptor for the next image is then retrieved and merged with super-descriptor for the first two images in the same way, by merging clusters that are close, and forming a new super-descriptor. When the cluster descriptors for all the images have been considered, the resulting super-descriptor is merged using all remaining clusters as set out in the first example.

In the above description, the cluster descriptors have already been derived. Alternatively, the image may be retrieved or supplied, and the descriptor derived from the image before performing the cluster merging.

In the first embodiment described above, a descriptor of a GoFGoP is derived by aggregating the descriptors for each image in the group.

In a second embodiment, the images are aggregated in the image or pixel domain, and then a dominant colour descriptor is derived from the aggregated image to produce a GoFGoP dominant colour descriptor. Thus, if there are N images 8 in the group, each image containing mxm pixels, the super-image 9 can be considered as an (Nxm)xm array of pixels, as shown in FIG. 6.

In contrast to the first embodiment, the second embodiment does not use the image descriptors for each image, but works directly with the images.

After the images have been aggregated, a dominant colour descriptor is derived from the super-image, using the technique described above in relation to the first embodiment.

An advantage of the second embodiment is that there is no loss of precision in the extraction process. However, a large amount of complexity, especially memory, may be required in considering all the images. To overcome the problem of complexity, the images may be temporally and/or spatially sub-sampled.

In the above, the images are aggregated in the image or pixel domain, and then a dominant colour descriptor is derived from the aggregated image to produce a GoFGoP dominant colour descriptor. Alternatively, each image could be aggregated in the colour domain (for example, in the form of a histogram for each image) and the dominant colour descriptor derived from the aggregated histograms. For example, a colour histogram for each image may be derived, or may be retrieved from a memory. Next, the colour histograms are combined by adding them together to form a super-image histogram, which may be normalised by the number of images forming the super-image. Finally, a dominant colour descriptor is derived from the super-image histogram, using the technique described above in relation to the first embodiment. In other words, the peaks (dominant colours) of the super-image histogram are selected, as well as the respective variances and weights.

Other techniques for aggregating the images before deriving the dominant colour descriptor may used. For example, instead of adding together the histograms for each image, the average, median or intersection of the group of images may be calculated. The dominant colour group descriptor is then derived from the resulting average, median or intersection histogram.

In a variation of the second embodiment, which applies to aggregation in the image/pixel domain and in the colour/histogram domain, the group of images are temporally sub-sampled, as described below. In this example, the cluster descriptors for each image is derived or retrieved. It is decided which images in the group to use in deriving the GoFGoP descriptor on the basis of similarity of the cluster descriptors.

The first image in a sequence from the group of images forms the initial super-image. The following images are discarded until the similarity between the cluster descriptor of an image and the last image added to the super-image (initially the first image) fulfils a predetermined decision condition. If an image meets the condition, it is added to the super-image. The following images in the group are then compared with the latest image added to the super-image until the predetermined condition is met again, and so on until all the images in the group have been considered. The dominant colour descriptor is then derived from the resulting super-image.

One possible decision criterion for image similarity is the value of the matching function between the respective DominantColor descriptors, such as described in our co-pending application WO00/67203, or using a matching function as described in the MPEG-7 book mentioned above. Another criterion could be the result of "on-line" merging described above. The "decision criterion" in this case would be fulfilled if all clusters have been merged into the existing descriptor. Another approach that would avoid extracting Dominant-Color for all images would be to compute a crude colour histogram and use the histogram matching function value as the criterion.

Both of these criteria require additional parameters to be specified: a threshold below which the matching function value is considered small in the first case, and merging threshold in the second case. An alternative approach, which would be particularly applicable in case of limited memory, would be to adapt the threshold so that a the number of images collected does not exceed a specified limit.

A third embodiment derives a GoFGoP dominant colour descriptor from the group of dominant colour descriptors for the group of images. More specifically, for a group of images, the respective dominant colour descriptors are retrieved from the descriptor database (or derived if they have not already been derived).

For each dominant colour descriptor, the distance between the descriptor and each of the remaining descriptors for the group is measured. This results in a set of distance measurements for each descriptor, which may be added together to give an overall distance measurement for each descriptor. The descriptor which has the smallest overall distance measurement is selected as a representative descriptor, and is treated as the GoFGoP dominant colour descriptor.

Other ways of selecting the representative descriptor may be used, preferably involving tests or comparisons involving at least some of the image descriptors for the images in the group. As another example, this could be done based on the distortion measure as defined in MPEG-7 if done for whole descriptors.

It is possible to pre-reject very close descriptors to reduce the computation.

Various methods are set out above for deriving a GoFGoP descriptor, especially a GoFGoP dominant colour descriptor.

There are various uses for the GoFGoP descriptor, such as in searching for and retrieving groups of images. For example, a user may wish to search for groups of images corresponding to an input image or group of images.

An outline of a search method is set out below.

Referring to FIG. 1, a query image is input by a user using suitable means such as a scanner or a digital camera, or by selecting a query image from a range of images displayed by the computer, or by selecting a region of any such images. A dominant colour descriptor for the image is derived, as described above. The query dominant colour descriptor is then compared with each of the GoFGoP dominant colour descriptors stored in the descriptor database. The GoFGoP dominant colour descriptors are in the same format as a single image dominant colour descriptor, and so matching can be performed, for example, using a matching function as set out in WO 00/67203 or similar, or a matching function as set out in section 13.3.2 of the MPEG-7 book mentioned above. The query descriptor may optionally also be compared with single image descriptors that may be stored in the database.

The results of the matching function are ordered, and the groups of images for which the matching function indicates the closest matches are retrieved. One or more images from the closest matches may be displayed.

Other methods of posing a query may be used. A query may be posed by selecting a group of images and extracting a GoFGoP descriptor as described above for the group. The group can be selected explicitly, for example, by selecting a range of frames or implicitly, for example, by selecting a keyframe in a video, where a "shot" including the keyframe is then derived using a suitable algorithm.

A system according to the invention may, for example, be provided in an image library. Alternatively, the databases may be sited remote from the control unit of the system, connected to the control unit by a temporary link such as a telephone line or by a network such as the Internet. The image and descriptor databases may be provided, for example, in permanent storage or on portable data storage media such as CD-ROMs or DVDs.

The system described above as an embodiment of the invention is in the form of a computer system. The computer system may be a standard computer which has been programmed using suitable programs for executing a method according to an embodiment of the invention. The programs may be stored in any suitable storage medium including fixed or permanent storage or removable storage means. The system may be modified using specific hardware and/or software, including, for example, specific chips. The invention may also be implemented in a specifically adapted apparatus, including specific hardware and/or software.

In the above description, the colour representations have been described in terms of red, green and blue colour components. Of course, other representations can be used, such as a representation using a hue, saturation and intensity, or YUV co-ordinate system, or a subset of colour components in any colour space, for example only hue and saturation in HSI.

The embodiment of the invention described above uses descriptors derived for images and groups of images. However, the image descriptors may be for regions of images, and similarly GoFGoP descriptors may be based on regions of images. Regions may be rectangular blocks, or regions of different shapes and sizes could be used. Alternatively, descriptors may be derived for regions of the image corresponding to objects, for example, a car, a house or a person. In either case, descriptors may be derived for all of the image or only part of it. Also, a GoFGoP group descriptor could be derived for a single image by applying the above methods to a plurality of regions in a image forming a group of image regions.

In the search procedure, instead of inputting a simple colour query or selecting an image block, the user can, for example, use the pointing device to describe a region of an image, say, by encircling it, whereupon the control unit derives a descriptor for that region and uses it for searching in a similar manner as described above. Also, instead of using images already stored in the image database for initiating a search, an image could be input into the system using, for example, an image scanner or a digital camera. In order to perform a search in such a situation, again the system first derives descriptors for the image or regions of the image, either automatically or as determined by the user.

Appropriate aspects of the invention can be implemented using hardware or software.

In the above embodiments, the cluster distributions for each representative colour are approximated using Gaussian functions, and the mean, variances and covariances of those functions are used in the descriptor values. However, other functions or parameters can be used to approximate the component distributions, for example, using basis functions such as sine and cosine, with descriptors based on those functions.

The invention claimed is:

1. A method of representing a group of images using at least one processor to process signals corresponding to the images, the method comprising:
    obtaining, using a processor, an image descriptor which is an image dominant colour representation for each image in the group of images, the image descriptors expressing the images in terms of one or more dominant colour values, and where each of the image descriptors has one or more components including at least one dominant colour value, and optionally for each dominant colour value, a variance indicating colour distribution variance of the image with respect to the dominant colour value, a weight indicating the influence of the dominant colour in the image, the number of dominant colours in the image, and spatial homogeneity of pixels corresponding to the dominant colors in the image;
    deriving, using a processor, a group descriptor which is a group dominant colour representation expressing the group of images in terms of one or more of said dominant colour values by aggregating a plurality of said image descriptors by combining, in a first stage, components for which the distance between the respective image dominant colours satisfies a predetermined condition, and combining other components in a second stage; and
    storing the group descriptor as a descriptor for the group of images,
    wherein said first stage comprises a first iteration of merging dominant colour values, and said second stage comprises at least one further iteration of merging dominant colour values, thereby successively reducing the number of dominant colour values.

2. A method as claimed in claim 1 where the group dominant colour representation has one or more components including at least one dominant colour value of the combined or selected image, and optionally for each dominant colour value, a variance indicating colour distribution variance with respect to the dominant colour value, a weight indicating the influence of the dominant colour in the combined or selected image, the number of dominant colours, and spatial homogeneity of pixels corresponding to the dominant colors in the combined or selected image.

3. A method as claimed in claim 1 involving temporally or spatially subsampling the group of images.

4. A method as claimed in claim 3 wherein images are omitted or included depending on their similarity to other images in the group.

5. An apparatus comprising:
    an image database storing images or groups of images;
    a descriptor database storing descriptors for the images or groups of images in the image database; and
    a processor configured to perform the method as claimed in claim 1.

6. A computer-readable storage medium storing computer-executable process steps for implementing a method as claimed in claim 1.

7. A computer system comprising:
    an image database storing images or groups of images;
    a descriptor database storing descriptors for the images or groups of images in the image database; and
    a control unit programmed to perform the method as claimed in claim 1.

* * * * *